United States Patent [19]
Koga et al.

[11] Patent Number: 4,933,242
[45] Date of Patent: Jun. 12, 1990

[54] POWER GENERATION SYSTEM WITH USE OF FUEL CELL

[75] Inventors: Minoru Koga, Kawasaki; Takenori Watanabe, Ichikawa; Tetsuya Hirata, Tokyo; Mutsumi Ogoshi, Chiba, all of Japan

[73] Assignee: Ishikawajima-Harima Heavy Industries Co., Ltd., Tokyo, Japan

[21] Appl. No.: 362,612

[22] Filed: May 15, 1989

[30] Foreign Application Priority Data

Feb. 28, 1989 [JP] Japan .................................. 1-45449

[51] Int. Cl.⁵ ............................................. H01M 8/06
[52] U.S. Cl. ........................................ 429/19; 429/38
[58] Field of Search ...................... 429/17, 19, 12, 38, 429/39, 16

[56] References Cited

U.S. PATENT DOCUMENTS 3,488,226 1/1970 Baker et al. ........................... 429/16
3,881,956 5/1975 Williams ................................ 429/12
4,647,516 3/1987 Matsumura et al. .................. 429/19

FOREIGN PATENT DOCUMENTS 0231878 9/1988 Japan .

Primary Examiner—Donald L. Walton
Attorney, Agent, or Firm—R. A. Blackstone, Jr.

[57] ABSTRACT

The power generation system with use of fuel cell, comprises: a cell stack including alternately piled up fuel cell elements and separator plates, each fuel cell element having an anode electrode, an electrolyte and a cathode electrode; a first reforming plate for partially reforming fuel gas to anode gas interposed between arbitrary adjacent separator plates instead of the cell element; a second reformer assembly for reforming the remainder of the fuel gas to the anode gas, the second reformer assembly including a plurality of plate type second reformers; an intermediate holder interposed between the cell stack and the second reformer assembly as they are piled up; an upper and a lower holders for sandwiching the cell stack, the intermediate holder and the second reformer assembly so as to hold them as one unit; and gas passages formed within the cell stack, the second reformer assembly, and the intermediate, the upper and the lower holders.

37 Claims, 7 Drawing Sheets

POWER GENERATION SYSTEM WITH USE OF FUEL CELL

BACKGROUND OF THE INVENTION

1. Technical Field

The present invention relates to a power generation system which employs fuel cells having electrolytes of molten carbonate, and more particularly it relates to a power generation system which includes stacks of fuel cells and reforming devices for reforming fuel gas to anode gas.

2. Background Art

The principle of the fuel cell is the reverse reaction of the electrolysis of water, i.e., chemical reaction of hydrogen of the anode gas with oxygen of the cathode gas accompanies production of electricity and water. A power generation system with use of fuel cells generally consists of a stack of fuel cell elements, a reformer for reforming the natural gas to the anode gas with steam, and a heat exchanger. Each cell element includes a porous anode electrode, a porous cathode electrode, and an electrolyte plate sandwiched by the anode and the cathode electrodes. The anode gas passages and the cathode gas passages are respectively defined on both faces of the separator plates. The fuel gas such as natural gas is supplied with steam to a reforming chamber of the fuel gas reforming device so as to reform the fuel gas to hydrogen-rich anode gas. The anode gas so obtained is then supplied to the anode gas passage formed on one face of the separator plate. On the other hand, an exhaust gas from the anode gas passage and fresh air heat the reforming chamber so as to maintain the reforming temperature. After that, the exhaust gas is mixed with air and then supplied to the cathode gas passage as the cathode gas. As for electrolyte plates, various types are available; for example, one made of phosphoric acid and another made of molten carbonate are well known. Reactions at the anode and the cathode electrodes, where the molten carbonate is employed as the electrolyte, are given by following equations:

Cathode: $\frac{1}{2} O_2 + CO_2 + 2e^- \longrightarrow CO_3^{2-}$

Anode: $H_2 + CO_3^{2-} \longrightarrow H_2O + CO_2 + 2e^-$

On the other hand, reforming reactions are as follows:

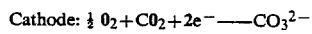

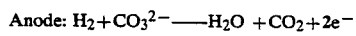

In the conventional fuel cell type power generation system, the fuel cell stack and the reformer have been designed as small as possible, namely they have plate-type configuration. However, since external conduits and piping for supplying/discharging the anode and cathode gases to/from the fuel cell stack and the reformer have been intricate, the entire system cannot be designed compact.

SUMMARY OF THE INVENTION

One object of the present invention is to provide a fuel cell type power generation system which possesses less complicated external passages and can be designed compact.

Another object of the present invention is to provide a fuel cell type power generation system which comprises plate-type separator plates and plate-type reforming devices with gas passages being formed as a part of themselves, the separator plates and the reforming devices.

According to one aspect of the present invention, there is provided a power generation system with use of fuel cells, which comprises:

a stack of cell elements and separator plates piled up one after the other;

a first reformer including a first reforming plate disposed between arbitrary adjacent separator plates instead of the cell element;

a second reformer assembly, each second reformer including second reforming plates, combustion plates and a dispersion plate; and holders for sandwiching the stack of cell elements and the separator plates, the first reformer, and the second reformer assembly so as to make them one united member, all the gas passages for the united member being formed within the united member and the holders These and other objects, aspects and advantages of the present invention will be more fully understood by reference to the following detailed description taken in conjunction with the various figures and appended Claims.

DESCRIPTION OF THE PREFERRED EMBODIMENTS

Figure 1:
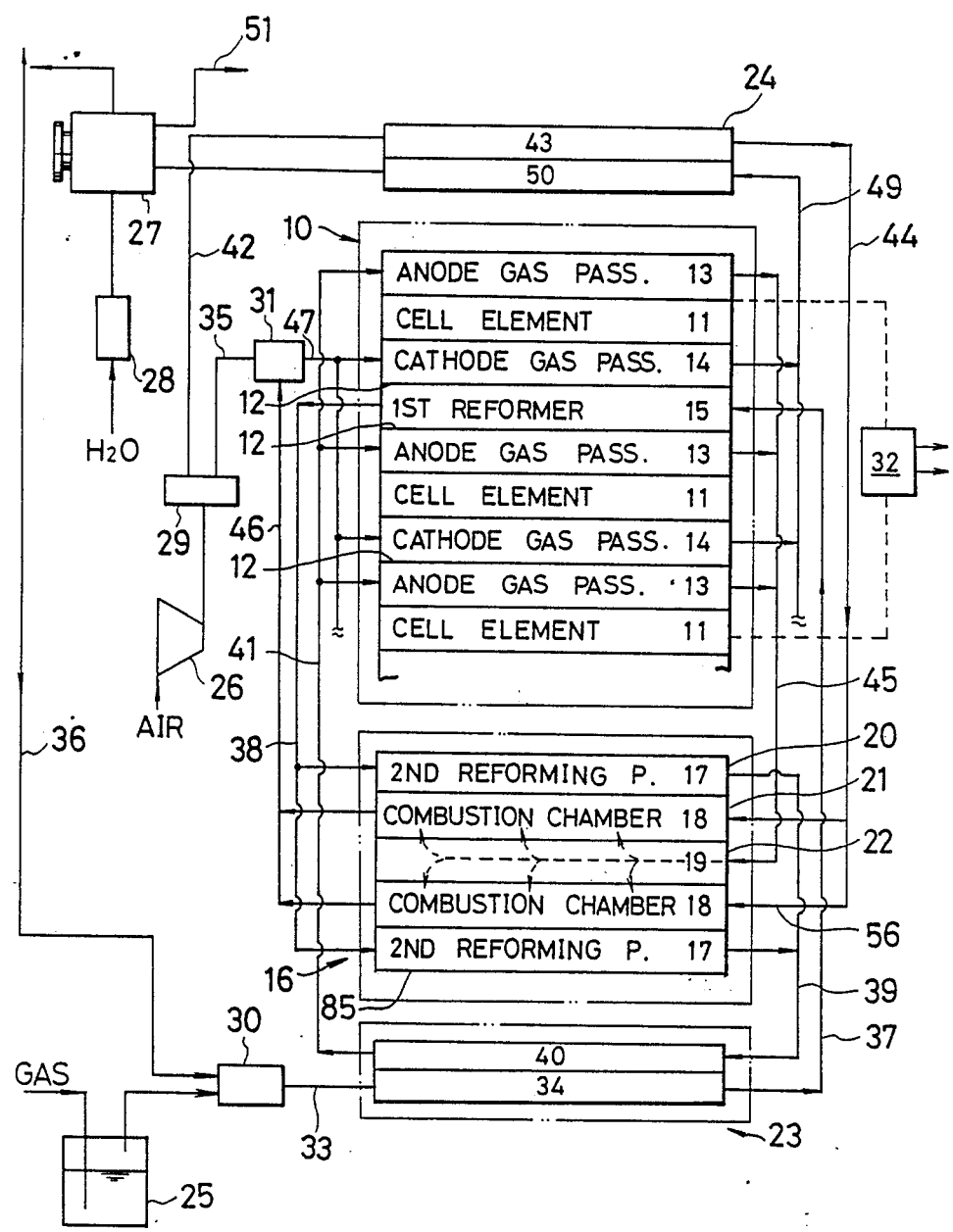
FIG. 1 is a schematic view of a major part of a fuel cell type power generation system according to the present invention.

Referring now to FIG. 1 of the accompanying drawings, a basic construction of a fuel cell type power generation system of the present invention will be explained. Reference numeral 10 designates a fuel cell stack which includes a plurality of cell elements 11 and separator plates 12. The cell elements 11 and the separator plates 12 are piled up one after the other. An anode gas passage 13 and a cathode gas passage 14 are respectively formed on the upper and the lower faces of the separator plate 12. A first reforming plate 15, which is the first reformer, is provided between arbitrary adjacent separator plates 12 instead of the cell element 11. Reference numeral 16 denotes a second reformer assembly. Each second reformer includes second reforming chambers 17 and 17, combustion chambers 18 and 18, and a dispersion chamber 19, which chambers are respectively defined within plates 20, 20, 21, 21 and 22. Numeral 23 denotes a plate type heat exchanger which includes a heating chamber 40 and a preheating chamber 34. The heat exchanger 23, the second reformer assembly 16 and the cell stack 10 are piled as one unit, and all the gas passages are formed through the unit. Numeral 24 designates another heat exchanger, 25 a desulfurizer, 26 a compressor, 27 a boiler, 28 a water softener, 29 a header, 30 and 31 ejectors, and 32 an inverter.

Raw material gas such as town gas or natural gas is desulfurized by the desulfurizer 25, and then fed into the preheating chamber 34 of the plate type heat exchanger 23 by the ejector 30 through an external line 33. Water ($H_2O$), on the other hand, is softened by the water softener 28 and heated to steam, and then fed also to the preheating chamber 34 of the plate type heat exchanger 23 by the ejector 30 through the external line 36. The raw material gas so preheated proceeds via an external line 37 to the first reforming chamber of the first reforming plate 15 in the cell stack 10, where it is reformed to the anode gas approximately 80%. After that, the gas proceeds to the second reforming chamber 17 of the second reforming plate 20 of the second reformer 16 via an external line 38, in which reforming chamber the residual hydrocarbon is reformed to the anode gas. The anode gas so produced flows to the heating chamber 40 of the plate type heat exchanger 23 via an external line 39, thereby preheating the raw material gas passing through the preheating chamber 34, and the same further flows into the anode gas passages 13 of the cell stack 10 via an external line 41.

Air, after compressed by the compressor 26, is sent via an external line 42 to the preheating chamber 43 of the heat exchanger 24 where it is preheated. Then, the air is supplied to the combustion chamber 18 of the combustion plates 21 of the second reformer assembly 16 via an external line 56. Meantime, the gases flowing through the anode gas passage 13 which include the unreacted hydrogen proceed to the dispersion chamber 19 of the dispersion plate 22 and in turn the combustion chambers 18 and 18 of each second reformer. Inside the combustion chamber 18, the gases including the unreacted hydrogen are burned with the air supplied thereto, and the temperature of the second reforming chamber 17 is maintained due to the combustion heat. The gas discharged from the combustion chamber 18 is sent to the ejector 31 through an external line 46, in which ejector it is mixed with the air coming from the header 29 via the external line 35. After that, the mixture of the discharged gas and air is fed to the cathode gas passages 14 via an external line 47, and in turn to the heating chamber 50 of the heat exchanger 24 via an external line 49 and to the boiler 27 thereby heating the water supplied from the softener 28 before being expelled through an external line 51.

In the cell stack 10, meanwhile, the gases are respectively fed to the anode gas and cathode gas passages which sandwich each cell element 11, and power generation takes place. Electricity generated in the cell stack is picked up from the outermost anode and cathode plates and changed to the alternating current through the invertor 32.

Figure 2:
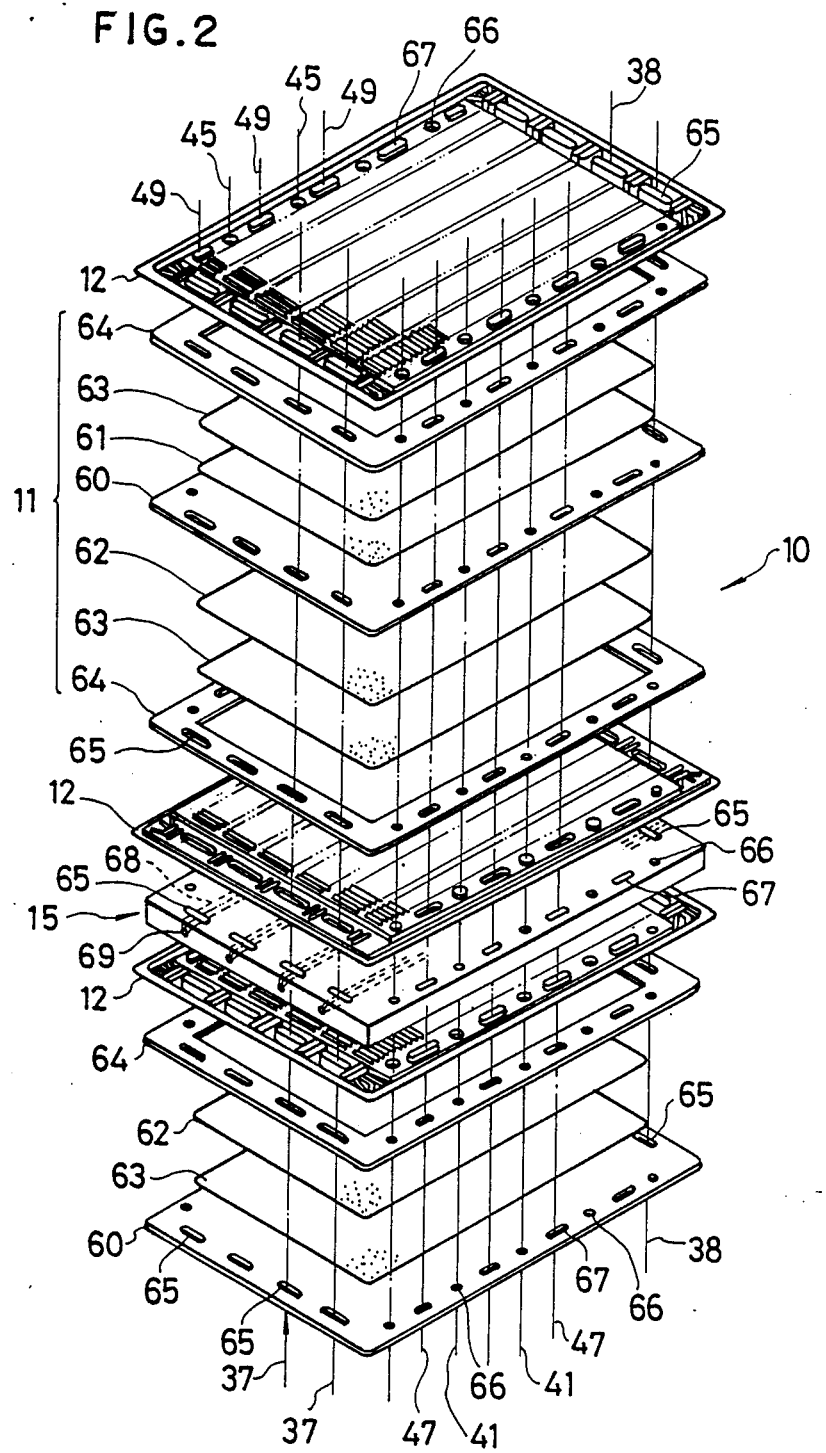
FIG. 2 is a perspective view of a fuel cell stack of FIG. 1.
Figure 3:
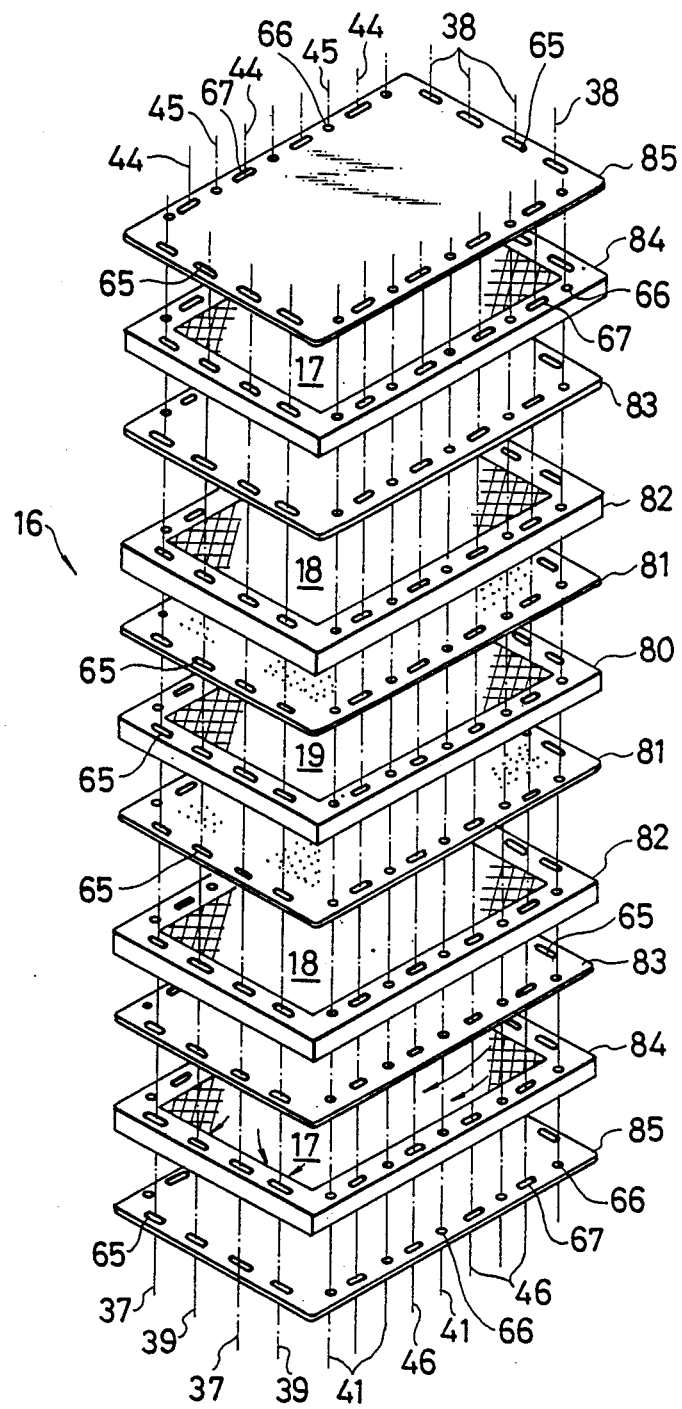
FIG. 3 is a perspective view of a second reformer assembly of FIG. 1.
Figure 4:
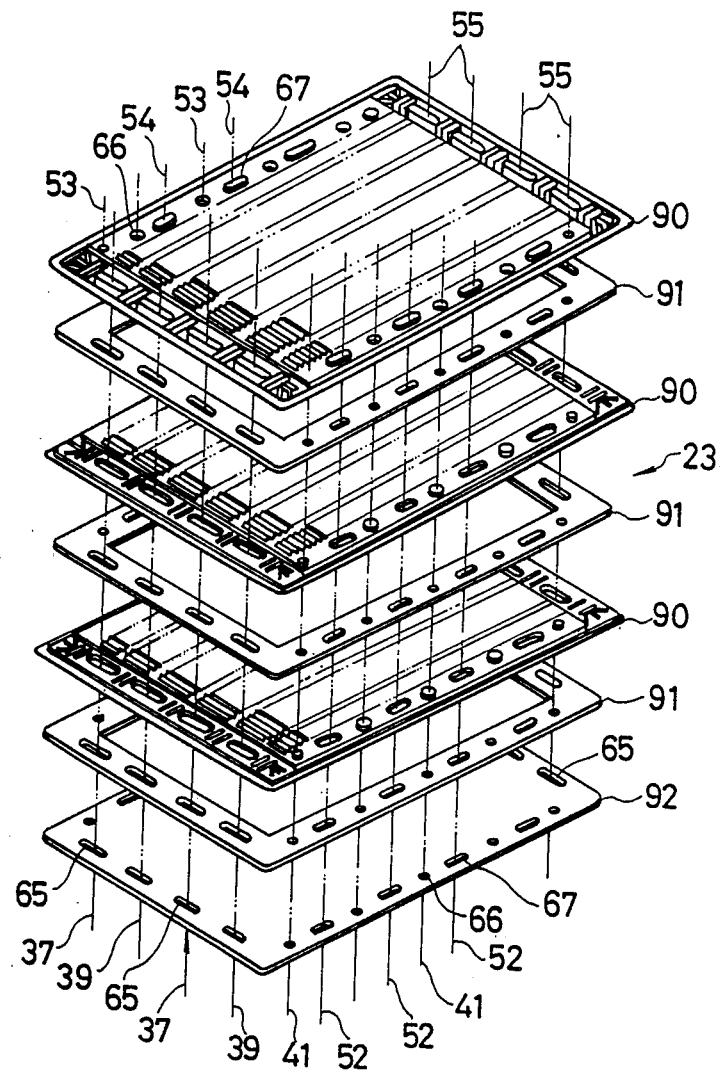
FIG. 4 is a perspective view depicting a plate type heat exchanger of FIG. 1.

Referring now to FIGS. 2 to 4, the details of the cell stack 10, the reformer assembly 16 and the plate type heat exchanger 23 will be explained.

FIG. 2 illustrates a part of the cell stack 10. The cell element 11 comprises: an electrolyte tile 60 which includes a porous ceramic plate filled with electrolyte; an anode electrode 61 and a cathode electrode 62 which sandwich the tile; perforated plates 63 and 63 which sandwich the anode and the cathode electrodes; and masking plates 64 and 64 which serve as distance-pieces surrounding the electrode and the perforated plate. The cell elements 11 and the separator plates 12 are piled up alternately, with the first reforming plate 15 being sandwiched by arbitrary separator plates 12 and 12 instead of the cell element 11, thereby forming the cell stack 10. Openings 65, 66 and 67 are formed along the periphery of the cell element 11, the separator plate 12 and the first reforming plate 15, so that the external lines or passages 37, 38, 41, 46, 47 and 56, which are already described with reference to FIG. 1, are defined as the cell stack, the separator plates and the reforming plate 15 are piled.

Figure 5:
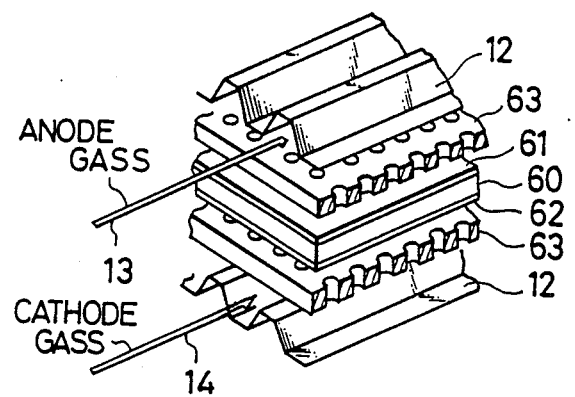
FIG. 5 is a fragmentary, enlarged view of a cell element of FIG. 1.

The separator plate 12, as shown in FIG. 5, is shaped like a corrugated plate so that it defines the anode gas passage 13 on one face thereof and the cathode gas passage on the other face thereof as it is sandwiched by the cell elements.

Figure 6:
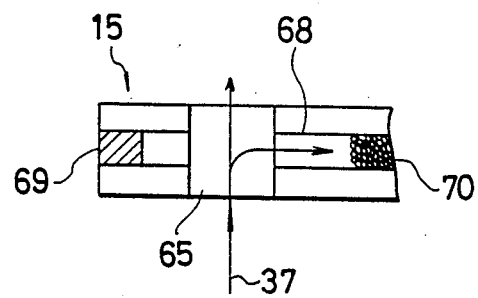
FIG. 6 is a fragmentary, enlarged view of a first reforming plate of FIG. 1.

The first reforming plate 15, as fragmentarily illustrated in FIG. 6, possesses a reforming chamber 68 of cylindrical shape which extends between the opening 65 of the passage 37 and the opening 65 of the passage 38 (not shown in FIG. 6). Reforming catalyst 70 is provided in the reforming chamber 68 and plugs 69 close both ends of the reforming chamber 68.

Referring now to FIG. 3, which depicts one second reformer of the assembly 16 sandwiched by two end holders 85, each second reformer comprises the dispersion plate 80, perforated plates 81 which sandwich the dispersion plate, combustion plates 82 which sandwich the perforated plates 81, heat exchanger plates 83 which sandwich the combustion plates, and second reforming plates 84 which sandwich the heat exchanger plates. The combustion plate 82 contains combustion catalyst. The second reforming plate 84 contains reforming catalyst. The dispersion plate 80 possesses the dispersion chamber 19 therein, the combustion plate 82 possesses the combustion chamber 18 therein, and the second reforming plate 84 possesses the second reforming chamber 17 therein. The plates 80, 81, 82, 83, 84 and 85 are provided with bores 65, 66 and 67 along the periphery thereof as the cell stack 10 is provided These bores define the passages 37, 38, 39, 41, 44, 45 and 46 as well as inlets and outlets (not shown) for the chambers 17, 18 and 19.

The plate type heat exchanger 23, as depicted in FIG. 4, comprises a plurality of alternately stacked fin-plates 90 and masking plates 91 with separating plates 92 being provided on the top and the bottom of the stack of the fin-plates and the masking plates. The plate type heat exchanger 23 also is provided with the bores 65, 66 and 67 along the periphery thereof so as to define the passage 37, 39, 41, 52, 53, 54 and 55.

Figure 7:
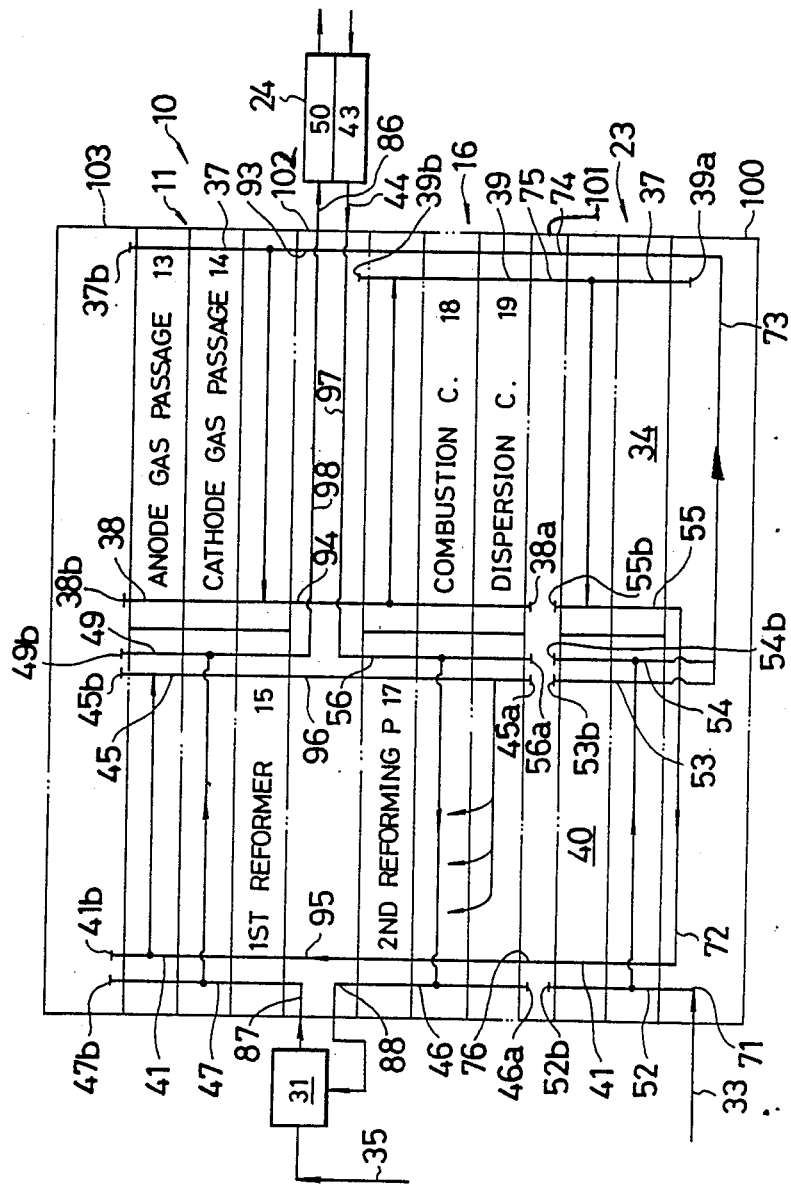
FIG. 7 shows various passages formed within the fuel cell stack.
Figure 8:
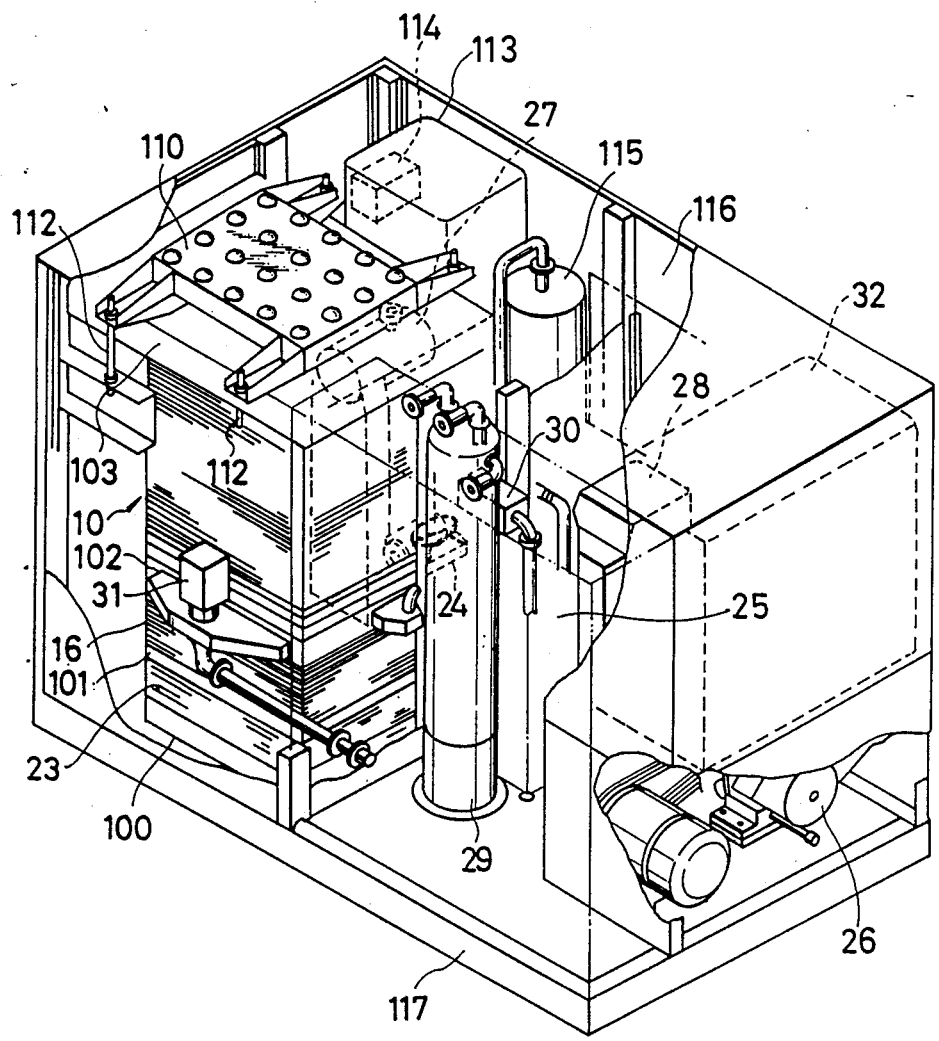
FIG. 8 is a perspective view of a power generation system according to the present invention.

As perspectively illustrated in FIG. 8, the plate type heat exchanger 23, the second reformer assembly 16 and the cell stack 10 are piled with holders 100, 101, 102 and 103 being interposed therebetween respectively. The passages 37, 38, 39, 41, 45, 47, 49, 52, 53, 54, 55 and 56 which are respectively formed in the heat exchanger, the second reformer assembly 16 and the cell stack 10 are connected to each other via the holders 100, 101, 102 and 103. The detail of the passage connection will be explained with FIG. 7 which illustrates the passages 13 and 14 and the chambers 15, 17, 18, 19, 34 and 40 that are viewed both in the longitudinal direction and the width direction of, for example, the separator plate in order to show the passages of FIGS. 2, 3 and 4 in one drawing. The passages 37, 38, 39 and 55 are formed by the openings 65 bored along the short periphery of, for example, the separator plate while the passages 45, 46, 52 and 53 are round openings 66 bored along the long periphery and the passages 41, 47, 49, 54 and 56 are formed by the oval openings 67 also bored along the long periphery. The lower holder 100 has a port 71 for connecting the line 33 and the passage 52 of the plate type heat exchanger 23, a port 72 for connecting the passage 55 and the passage 41, and a port 73 for connecting the passages 53, 54 and the passage 37. The lower holder also closes the lowermost end 39a of the passage 39.

The holder 101 between the plate type heat exchanger 23 and the second reformer assembly 16 has ports 74, 75 and 76 for connecting the heat exchange 23 and the passages 37, 39 and 41 of the second reformer assembly 16, and closes the upper ends 52b, 53b, 54b and 55b of the passages 52, 53, 54 and 55, and the lower ends 38a, 45a, 46a and 56a of the passages 38, 45, 56 and 56 respectively.

The holder 102 between the second reformer assembly 16 and the cell stack 10 has ports 93, 94, 95 and 96 for connecting the passages 37, 38, 41 and 45 of the second reformer assembly 16 and the same numbered passages of the cell stack 10, a port 97 for connecting the external line 44 from the preheating chamber 43 of the heat exchanger 24 and the passage 56 of the reformer assembly 16, a port 98 for connecting the passage 45 of the cell stack 10 and the external line 86 to the heating chamber 50 of the heat exchanger 24, a port 87 for connecting the ejector 31 and the passage 47 of the cell stack 10 and a port 88 for connecting the passage 45 of the second reformer 16 and the ejector 31. The holder 102 also closes the upper end 39b of the passage 39 of the reformer 16.

The upper holder 103 closes the upper ends 37b, 38b, 41b, 45b, 47b and 49b of the passages 37, 38, 41, 45, 47 and 49 of the cell stack 10.

As appreciated from the above description, the number of the conduits or pipes which are attached from outside can be reduced since the most passages are formed within the fuel cell stack and the periphery members thereof, and those passage are connected to each other or closed by the holders 100, 101, 102 and 103. FIG. 8 depicts the power generation system of the present invention, in which reference numeral 10 designates the cell stack, 16 the second reformer assembly, 23 the plate type heat exchanger, all of which are piled up with the holders 100, 101, 102 and 103 being respectively interposed therebetween and tightly mounted by an upper presser plate 110 and associated bolts and nuts 112. Numeral 27 designates the boiler, 24 the heat exchanger, 25 the desulfurizer, 26 the compressor, 28 the water softener, 29 the header, 30 and 31 the ejectors, 32 the inverter, 113 a water tank, 114 a water pump, 115 an auxiliary combustor, 116 a controller, and 117 a housing for the power generation system.

As appreciated from the above description, since the first reforming plate is disposed between the separator plates, the reforming temperature is maintained by the heat of the cell stack. Also, the external pipe arrangement can be simplified since the second reformer assembly and the cell stack are stacked via the holders, and the gas passages are formed in the cell stack, the reformer assembly and the holders.

It is recognized, of course, that those skilled in the art may make various modifications or additions to the foregoing embodiment chosed to illustrate the invention without departing from the spirit and scope of the present contribution to the art. For example, the cathode gas may flow in counter directions in the adjacent passages 14 and 14. Also, the plate type heat exchanger 23 may not be necessarily disposed under the second reformer assembly 16.

We claim:

1. Power generation system with use of fuel cell, comprising:
   a cell stack including alternately piled up fuel cell elements and separator plates, each fuel cell element having an anode electrode, an electrolyte and a cathode electrode;
   a first reformer for partially reforming fuel gas to anode gas interposed between the separator plates instead of the cell element, the first reformer including a first reforming plate;
   a second reformer assembly for reforming the remainder of the fuel gas to the anode gas, the second reformer assembly including a plurality of plate type second reformers;
   an intermediate holder interposed between the cell stack and the second reformer assembly as they are piled up;
   an upper and a lower holders for sandwiching the cell stack, the intermediate holder and the second reformer assembly so as to make them one unit; and
   gas passages formed within the cell stack, the second reformer assembly, and the intermediate, the upper and the lower holders.

2. Power generation system with use of fuel cell according to claim 1, wherein the cell element includes a tile of electrolyte made of molten carbonate, and the anode and the cathode electrodes which sandwich the tile of electrolyte.

3. Power generation system with use of fuel cell according to claim 2, wherein that face of the separator plate which contacts the cell element possesses a corrugated portion so that an anode gas passage is defined between the anode electrode and the separator plate and a cathode gas passage is defined between the cathode electrode and the separator plate.

4. Power generation system with use of fuel cell according to claim 3, wherein the first reforming plate possesses a first reforming chamber in which reforming catalyst is provided, so that the fuel gas supplied to the first reforming chamber is reformed to hydrogen with steam also supplied to the first reforming chamber.

5. Power generation system with use of fuel cell according to claim 1, wherein the second reformer assembly includes a plurality of plate type second reformers, the second reformers being piled up with end holders being interposed between each adjacent two second reformers, and each second reformer including;
   a dispersion plate which has a dispersion chamber;
   combustion plates which sandwich the dispersion plate, each combustion plate having a combustion chamber; and
   second reforming plates which sandwich the combustion plates, each second reforming plate having a second reforming chamber.

6. Power generation system with use of fuel cell according to claim 5, wherein as the fuel gas is supplied to the dispersion chamber of the dispersion plate and combustion air is supplied to the combustion chambers of the combustion plates, the fuel gas coming through the dispersion plate flows into the combustion chambers and then burned therein, so that temperature of a reforming reaction in each second reforming chamber is maintained due to the heat of the combustion in the combustion chamber.

7. Power generation system with use of fuel cell according to claim 6, wherein a reforming catalyst is provided in the second reforming chamber of the second reforming plate in the second reformer assembly, and the gas from the first reforming chamber of the cell stack is introduced to the second reforming chamber.

8. Power generation system with use of fuel cell according to claim 4, wherein the gas passages formed in the cell stack includes:
 passages for supplying/discharging the fuel gas to/from the first reforming plate;
 passages for supplying/discharging the anode gas to/from the anode gas passages; and
 passages for supplying/discharging the cathode gas to/from the cathode gas passages,
 all the passages being defined by openings formed in the cell elements, the separator plates, and the first reforming plate along the periphery thereof as they are stacked and aligned.

9. Power generation system with use of fuel cell according to claim 7, wherein the holder between the cell stack and the second reformer assembly possesses ports for connecting the passages formed in the cell stack and the passages formed in the second reformer assembly, such that the fuel gas supplied to the first reforming plate via the passages formed in the cell stack is introduced to the second reforming chamber in the second reformer assembly via the ports formed in said holder.

10. Power generation system with use of fuel cell according to claim 9, wherein the gas passages formed in the second reformer assembly includes:
 passages for supplying/discharging the gas reformed by the first reforming plate to/from the second reforming plates;
 passages for supplying/discharging the combustion air to/from the combustion chambers; and
 passages for supplying/discharging the fuel gas to/from the dispersion chambers,
 all the passages being defined by openings formed in the second reforming plates, the combustion plates and the dispersion plate along the periphery thereof as they are stacked and aligned.

11. Power generation system with use of fuel cell according to claim 10, wherein the gas reformed through the second reforming chamber of the second reformer assembly is fed to the anode gas passages in the cell stack as the anode gas.

12. Power generation system with use of fuel cell according to claim 10, wherein the gas discharged from the combustion chambers is mixed with air and then fed to the cathode gas passages in the cell stack.

13. Power generation system with use of fuel cell, comprising:
 a cell stack including alternately piled up fuel cell elements and separator plates, each fuel cell element having an anode electrode, an electrolyte and a cathode electrode;
 a first reformer for partially reforming fuel gas to anode gas interposed between the separator plates instead of the cell element, the first reformer including a first reforming plate;
 a second reformer assembly for reforming the remainder of the fuel gas to the anode gas, the second reformer assembly including a plurality of plate type second reformers;
 a plate type heat exchanger including a preheating chamber in which the fuel gas and the steam are introduced, and
 a heating chamber in which the anode gas is introduced;
 a first intermediate holder interposed between the cell stack and the second reformer assembly as they are piled up;
 a second intermediate holder interposed between the second reformer assembly and the plate type heat exchanger as they are piled up;
 an upper and a lower holders for sandwiching the cell stack, the first and second intermediate holders, the second reformer assembly and the plate type heat exchanger, so as to make them one unit; and
 gas passages formed within the cell stack, the second reformer assembly, the plate type heat exchanger, and the first intermediate, the second intermediate, the upper and the lower holders.

14. Power generation system with use of fuel cell according to claim 13, further including a tightening device for holding the upper holder, the cell stack, the first intermediate holder, the second reformer assembly, the second intermediate holder, the plate type heat exchanger and the lower holder.

15. Power generation system with use of fuel cell according to claim 14, wherein the cell element includes a tile of electrolyte made of molten carbonate, and the anode and the cathode electrodes which sandwich the tile of electrolyte.

16. Power generation system with use of fuel cell according to claim 14, wherein that face of the separator plate which contacts the cell element possesses a corrugated surface, so that an anode gas passage is defined between the anode electrode and the separator plate and a cathode gas passage is defined between the cathode electrode and the separator plate.

17. Power generation system with use of fuel cell according to claim 16, wherein the first reforming plate possesses a first reforming chamber in which reforming catalyst is provided, so that the fuel gas passing through the preheating chamber of the plate type heat exchanger and steam are supplied to the first reforming chamber and reformed to hydrogen under the presence of the steam.

18. Power generation system with use of fuel cell according to claim 14, wherein the second reformer assembly includes a plurality of plate type second reformers, the second reformers being piled up with end holders being interposed between each adjacent two second reformers, and each second reformer including;
 a dispersion plate which has a dispersion chamber;
 combustion plates which sandwich the dispersion plate, each combustion plate having a combustion chamber; and
 second reforming plates which sandwich the combustion plates, each second reforming plate having a second reforming chamber.

19. Power generation system with use of fuel cell according to claim 18, wherein as the fuel gas is supplied to the dispersion chamber of the dispersion plate and combustion air is supplied to the combustion chambers of the combustion plates, the fuel gas coming through the dispersion plate flows into the combustion chambers and then burned therein so that temperature of a reforming reaction in each second reforming chamber is maintained due to the heat of the combustion in the combustion chamber.

20. Power generation system with use of fuel cell according to claim 18, wherein a reforming catalyst is provided in the second reforming chamber of the second reforming plate in the second reformer assembly, and the gas from the first reforming chamber of the cell stack is introduced to the second reforming chamber.

21. Power generation system with use of fuel cell according to claim 14, wherein the plate type heat exchanger includes a plurality of piled up fin-plates, and the preheating chamber and the heating chamber are respectively defined on the upper and the lower face of each fin-plate.

22. Power generation system with use of fuel cell according to claim 16, wherein the gas passages formed in the cell stack includes:
   passages for supplying/discharging the fuel gas to/from the first reforming plate;
   passages for supplying/discharging the anode gas to/from the anode gas passages; and
   passages for supplying/discharging the cathode gas to/from the cathode gas passages, all the passages being defined by openings formed in the cell elements, the separator plates, and the first reforming plate along the periphery thereof as they are stacked and aligned.

23. Power generation system with use of fuel cell according to claim 18, wherein the gas passages formed in the second reformer assembly includes:
   passages for supplying/discharging the gas reformed through the first reforming chamber to/from the second reforming chambers of the second reforming plates;
   passages for supplying/discharging the combustion air to/from the combustion chambers; and
   passages for supplying/discharging the fuel gas to/from the dispersion chambers, all the passages being defined by openings formed in the second reforming plates, the combustion plates and the dispersion plate along the periphery thereof as they are stacked and aligned.

24. Power generation system with use of fuel cell according to claim 16, wherein the gas passages formed in the plate type heat exchanger includes: and
   passages for supplying/discharging the fuel gas and the steam to/from the preheating chambers;
   passages for supplying/discharging the anode gas to/from the heating chambers;
   all the passages being defined by openings formed in the fin-plates along the periphery thereof as they are piled up and aligned.

25. Power generation system with use of fuel cell according to claim 24, wherein the lower holder possesses a port for the fuel gas and the steam, some of the passages extend from the port to the preheating chambers of the plate type heat exchanger, and the fuel gas and the steam which have passed through the preheating chamber are fed to the first reforming chamber of the first reforming plate via the passages formed through the lower holder, the plate type heat exchanger, the second intermediate holder, the second reformer assembly, the first intermediate holder and the cell stack.

26. Power generation system with use of fuel cell according to claim 20, wherein the gas reformed through the first reforming chamber of the first reforming plate is fed to the second reforming chamber of the second reforming plate via the passages formed in the cell stack, ports formed in the first and second intermediate holders, the passages formed in the second reformer assembly.

27. Power generation system with use of fuel cell according to claim 24, wherein the second reformer assembly, the plate type heat exchanger and the second intermediate holder respectively possess passages for supplying the gas reformed by the second reforming chamber to the heating chamber of the plate type heat exchanger as the anode gas.

28. Power generation system with use of fuel cell according to claim 27, wherein the gas which has passed through the heating chamber of the plate type heat exchanger is supplied to the anode gas passages via the ports formed in the lower holder, the passages formed in the plate type heat exchanger, the ports formed in the second intermediate holder, the passages formed in the second reformer assembly, the ports formed in the first intermediate holder and the passages formed in the cell stack.

29. Power generation system with use of fuel cell according to claim 28, wherein the gas which has passed through the anode gas passages is supplied to the dispersion chamber via the passage formed in the cell stack, the ports formed in the first intermediate holder, and the passages formed in the second reformer assembly.

30. Power generation system with use of fuel cell according to claim 29, wherein the first intermediate holder possesses a port for guiding the combustion air to the combustion chamber coming through the combustion air passage.

31. Power generation system with use of fuel cell according to claim 30, wherein air is added to the gas discharged from the combustion chamber, and the mixture thereof is supplied to the cathode gas passage through the passages formed in the cell stack.

32. Power generation system with use of fuel cell according to claim 31, wherein the first intermediate holder is provided with an ejector, and the ejector serves to mix the gas discharged from the combustion chamber and the air.

33. Power generation system with use of fuel cell according to claim 32, wherein the first intermediate holder possesses a port connected to the passage through which the gas discharged from the cathode gas passage flows, so as to expel the cathode gas out of the cell stack.

34. Power generation system with use of fuel cell according to claim 5, wherein a heat transfer plate in interposed between the combustion plate and the second reforming plate to promote heat transfer therebetween.

35. Power generation system with use of fuel cell according to claim 2, wherein the cell element includes a tile of electrolyte made of molten carbonate, an anode electrode and a cathode electrode which sandwich the tile, and an anode perforated plate and a cathode perforated plate which sandwich the anode and the cathode electrodes, and the separator plate possesses a corrugated portion, so that an anode gas passage is defined between the anode perforated plate and the separator plate and a cathode gas passage is defined between the cathode perforated plate and the separator plate.

36. Power generation system with use of fuel cell according to claim 18, wherein a heat transfer plate is interposed between the combustion plate and the second reforming plate to promote heat transfer therebetween.

37. Power generation system with use of fuel cell according to claim 14, wherein the cell element includes a tile of electrolyte made of molten carbonate, an anode electrode and a cathode electrode which sandwich the tile, and an anode perforated plate and a cathode perforated plate which sandwich the anode and the cathode electrodes, and the separator plate possesses a corrugated portion, so that an anode gas passage is defined between the anode perforated plate and the separator plate and a cathode gas passage is defined between the cathode perforated plate and the separator plate.

* * * * *